US008176121B2

(12) United States Patent
Leblanc et al.

(10) Patent No.: US 8,176,121 B2
(45) Date of Patent: May 8, 2012

(54) SYSTEM, NETWORK AND METHOD FOR MULTI-PLATFORM PUBLISHING AND SYNCHRONIZED CONTENT

(76) Inventors: Michael Leblanc, Fredericton (CA); Jody Glidden, Sterling, VA (US); David James Hudson, Fredericton (CA); Jacob Samuel O'Reilly, Fredericton (CA); Michael Derek Waugh, Fredericton (CA); Silvio Verzilli, Fredericton (CA); Howard Frith Powell, Fredericton (CA)

( * ) Notice: Subject to any disclaimer, the term of this patent is extended or adjusted under 35 U.S.C. 154(b) by 205 days.

(21) Appl. No.: 12/435,232

(22) Filed: May 4, 2009

(65) Prior Publication Data

US 2010/0161729 A1 Jun. 24, 2010

Related U.S. Application Data

(60) Provisional application No. 61/140,663, filed on Dec. 24, 2008.

(51) Int. Cl.
*G06F 15/16* (2006.01)

(52) U.S. Cl. ......... 709/204; 709/206; 709/246; 713/189

(58) Field of Classification Search ................... 709/204
See application file for complete search history.

(56) References Cited

U.S. PATENT DOCUMENTS

| | | | | |
|---|---|---|---|---|
| 6,631,446 | B1 * | 10/2003 | Cherkauer et al. | 711/134 |
| 2002/0116533 | A1 * | 8/2002 | Holliman et al. | 709/246 |
| 2002/0120697 | A1 * | 8/2002 | Generous et al. | 709/206 |
| 2004/0133797 | A1 * | 7/2004 | Arnold | 713/200 |
| 2006/0041605 | A1 * | 2/2006 | King et al. | 707/205 |
| 2006/0080506 | A1 * | 4/2006 | Rajamony et al. | 711/119 |
| 2006/0294396 | A1 * | 12/2006 | Witman et al. | 713/189 |
| 2008/0233930 | A1 | 9/2008 | Wurster et al. | |
| 2008/0242325 | A1 | 10/2008 | Bandera | |
| 2009/0150127 | A1 * | 6/2009 | Ghorayeb et al. | 703/2 |
| 2010/0082760 | A1 * | 4/2010 | Martino et al. | 709/206 |

FOREIGN PATENT DOCUMENTS

| | | | |
|---|---|---|---|
| WO | 0223375 | A2 | 3/2002 |
| WO | 2005109803 | A2 | 11/2005 |
| WO | 2008143493 | A2 | 11/2008 |

* cited by examiner

*Primary Examiner* — Quang N. Nguyen
*Assistant Examiner* — Tesfay Yohannes
(74) *Attorney, Agent, or Firm* — Norton Rose Canada LLP

(57) ABSTRACT

A method for synchronizing content delivery to a plurality of delivery devices of a user. A communications network and a system are also provided. The delivery devices include at least one computer connected to internet and at least one mobile device. The method comprises retrieving profile data concerning the plurality of delivery devices of the user; sending an invitation to deliver content to the plurality of delivery devices of the user; receiving at least two responses to the invitation, for each response received: identifying a responding delivery device of the plurality of delivery devices from which the response is received using the profile data; retrieving a platform type of the responding delivery device accepting the invitation; and retrieving and providing a delivery version of the content in a delivery format acceptable for the platform of the responding delivery device. In one embodiment, the method further comprises tracking usage of the content by the user on each the responding delivery device.

24 Claims, 8 Drawing Sheets

SYSTEM, NETWORK AND METHOD FOR MULTI-PLATFORM PUBLISHING AND SYNCHRONIZED CONTENT

CROSS REFERENCE TO RELATED APPLICATIONS

The present application claims priority to U.S. Provisional Application No. 61/140,663 filed Dec. 24, 2008, the entirety of which is hereby incorporated by reference.

TECHNICAL FIELD

The present disclosure relates generally to portable devices, and more particularly to a system, network and method for synchronized delivery of content such as text, graphics, audio and video to multiple delivery devices with different platforms.

BACKGROUND

Delivery systems for multiple platforms exist in the market today. These systems typically deliver 'alerts' in the form of text, an image or an email. There are no systems for delivery of mobile content to multiple platforms. Mobile content delivery is when content that is developed specifically for a mobile device is sent to a selected user's mobile device. The content is developed, packaged, and then sent to a user in a format that allows playback on a mobile device. In order for this content to be available on another platform it would need to be recreated/re-authored and then republished. This content is not available on another platform, such via a web browser on the internet.

One of the problems with the current systems is that they do not allow the user the flexibility to access the content where it is most convenient. The content is packaged and delivered as an e-mail attachment or is retrieved through an HTML link. With these methods, the user must download the content as an e-mail attachment or download the content as a link from an HTML page. These methods also require end-user interaction and intervention for successful delivery. These methods do not allow for the tracking of when the content was accessed or if it was successfully delivered to the device.

Another existing problem with the current systems for mobile delivery is that the user must access the content on a mobile device or take any assessments or surveys on the mobile device. The user is not able to access the same content or take the same assessment or survey on a web browser. This content would be considered two separate courses if they were available and therefore would not be synchronized.

These limitations also do not allow a content publisher to create a version of the content and send it to users without having to worry about what platform the user is going to use to access the content on.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

Figure 1:
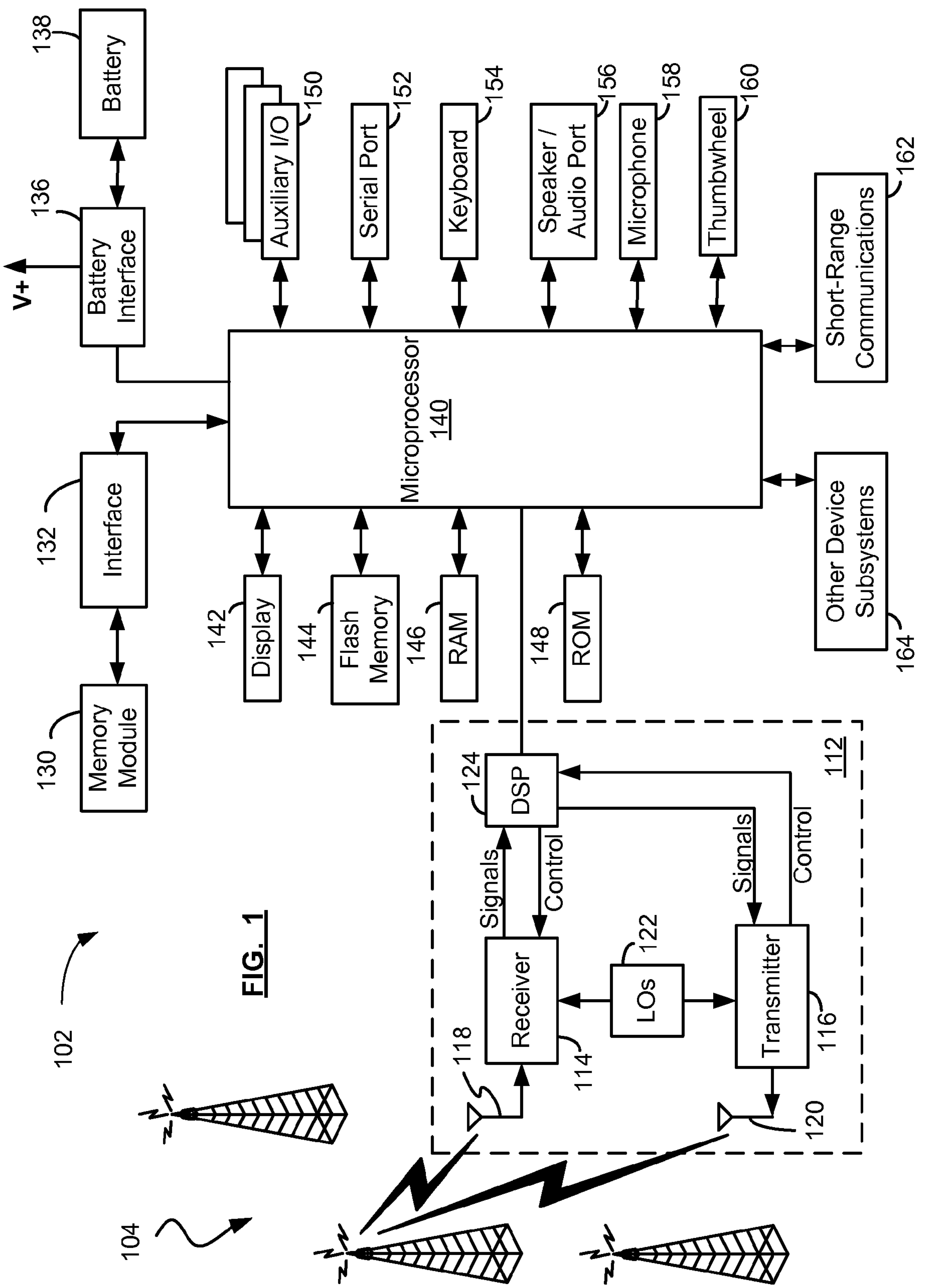
FIG. 1 shows in block diagram form a wireless device suitable for having a mobile content player in accordance with one embodiment.

The term "content" is used herein to refer to one or more digital media types that, when combined, create a document or a content package. This package can have text, images, video, audio and other media types in it.

This present method and system allow a content author to create content for users and publish the content to multiple platforms without modifying or reconfiguring the content for use on the different platforms.

The content is delivered to each delivery device specified for the user. The delivery device can be a mobile device, a personal computer, a classroom workstation, a training kiosk terminal, a wireless museum interactive personal guide, etc. The desktop computer platform can be any computer having wired access to the internet. The mobile device is a mobile wireless communication device which communicates over a communication network, including cellular telephones, mobile phones, smartphones, wireless laptop computers, Blackberries, personal digital assistants (PDAs), pagers and the like.

The content can be pushed to the configured mobile device and a notification can be sent to the user with a URL link that will allow a desktop player to access the same content without any reformatting of the content by the content author.

It allows an author to create the content once and automatically deliver the content to the targeted user on multiple platforms. It does not require any end-user intervention to deliver the content.

According to one broad aspect of the present invention, there is provided a method for synchronizing content delivery to a plurality of delivery devices of a user. The delivery devices include at least one computer connected to internet and at least one mobile device. The method comprises retrieving profile data concerning the plurality of delivery devices of the user; sending an invitation to deliver content to the plurality of delivery devices of the user; receiving at least two responses to the invitation from separate delivery devices, for each response received: identifying a responding delivery device of the plurality of delivery devices from which the response is received using the profile data; retrieving a platform type of the responding delivery device accepting the invitation; and retrieving and providing a delivery version of the content in a format acceptable for the platform of the responding delivery device.

In one embodiment, the method further comprises retrieving an access application type for the responding delivery device corresponding to an access application on the responding delivery device for accessing the content; wherein the access application is one of a browser connected to internet and a local player on the delivery device having access to a local storage on the delivery device; wherein retrieving the delivery version of the content comprises formatting the delivery format for the access application; wherein providing the delivery version comprises, depending on the access application, one of sending the delivery version of the content for download by the responding delivery device and providing the delivery version for accessing in the browser on the responding delivery device.

In one embodiment, the method further comprises authoring the content in a single author format; transcoding the content from the single author format to at least one delivery format.

In one embodiment, the method further comprises tracking usage of the content by the user on each the responding delivery device.

In one embodiment, the tracking comprises storing a user log for each of the responding delivery device, the user log including a time stamp and an activity description for at least one activity carried out by the user on the content; transmitting the user log for each of the responding delivery device to a content tracker; cumulating the user log from each of the responding delivery device for the user at the content tracker in a user content profile.

In one embodiment, the activity is one of a beginning of an access to the content, an end of an access to the content, a completion of rendering of a section of the content, an inputting of an answer in an assessment portion of the content.

In one embodiment, the method further comprises extracting access statistics from the user content profile for the user.

In one embodiment, the method further comprises gathering assessment statistics from the user content profile for the user.

In one embodiment, the method further comprises reporting at least one of the access statistics and the assessment statistics.

In one embodiment, the method further comprises reporting providing a rendering limit, the rendering limit being a number of times the user is allowed to render the content on the plurality of delivery devices; obtaining an access count from the access statistics, the access count being a number of times the user has accessed the content on any of the delivery devices; comparing the access count to the rendering limit; if the access count is equal to the rendering limit, blocking access to the content on all the responding delivery devices.

In one embodiment, blocking access comprises transmitting a blocked access replacement content to the responding delivery device.

According to another broad aspect of the present invention, there is provided a communications network having at least one content server configurable to deliver content to a plurality of delivery devices. The content server is configured for retrieving profile data concerning the plurality of delivery devices of the user from a user profile storage; sending an invitation to deliver content to the plurality of delivery devices of the user through a platform connector; receiving at least two responses to the invitation from separate delivery devices at the platform connector; for each response received: identifying a responding delivery device of the plurality of delivery devices from which the response is received using the profile data; retrieving a platform type of the responding delivery device accepting the invitation; retrieving and providing a delivery version of the content in a format acceptable for the platform of the responding delivery device from a central content storage.

In one embodiment, the platform connector further comprises retrieving an access application type for the responding delivery device corresponding to an access application on the responding delivery device for accessing the content; wherein the access application is one of a browser connected to internet and a local player on the delivery device having access to a local storage on the delivery device; wherein retrieving the delivery version of the content comprises formatting the delivery format for the access application; wherein providing the delivery version comprises, depending on the access application, one of sending the delivery version of the content for download by the responding delivery device and providing the delivery version for accessing in the browser on the responding delivery device.

In one embodiment, the communications network further comprises a content authoring system for authoring the content in a single author format; a content delivery system for transcoding the content from the single author format to at least one delivery format and storing the content in the at least one delivery format in the central content storage.

In one embodiment, the communications network further comprises a user tracker for tracking usage of the content by the user on each the responding delivery device.

In one embodiment, the communications network further comprises a content tracker for cumulating the usage tracked by the user tracker from each of the responding delivery device for the user in a user content profile.

According to another broad aspect of the present invention, there is provided a synchronized content delivery system for delivering synchronized content to a plurality of delivery devices. The synchronized content delivery system comprises a plurality of delivery devices of a user, including at least one computer connected to internet and at least one mobile device; a user profile storage including profile data concerning the plurality of delivery devices of the user; a platform connector for sending an invitation to deliver content to the plurality of delivery devices of the user and for receiving at least two responses to the invitation from separate delivery devices, the platform connector, for each response received, identifying a responding delivery device of the plurality of delivery devices from which the response is received using the profile data; retrieving a platform type of the responding delivery device accepting the invitation; retrieving and providing a delivery version of the content in a format acceptable for the platform of the responding delivery device.

In one embodiment, the platform connector further comprises retrieving an access application type for the responding delivery device corresponding to an access application on the responding delivery device for accessing the content; wherein the access application is one of a browser connected to internet and a local player on the delivery device having access to a local storage on the delivery device; wherein retrieving the delivery version of the content comprises formatting the delivery format for the access application; wherein providing the delivery version comprises, depending on the access application, one of sending the delivery version of the content for download by the responding delivery device and providing the delivery version for accessing in the browser on the responding delivery device.

In one embodiment, the synchronized content delivery system further comprises a content authoring system for authoring the content in a single author format; a content delivery system for transcoding the content from the single author format to at least one delivery format and storing the content in the at least one delivery format in the central content storage.

In one embodiment, the synchronized content delivery system further comprises a user tracker for tracking usage of the content by the user on each the responding delivery device.

In one embodiment, the synchronized content delivery system further comprises a content tracker for cumulating the usage tracked by the user tracker from each of the responding delivery device for the user in a user content profile.

Reference is first made to FIG. 1, which shows a block diagram illustrating a portable wireless device 102 that is suitable for having a mobile content player in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items.

One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel or trackball 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
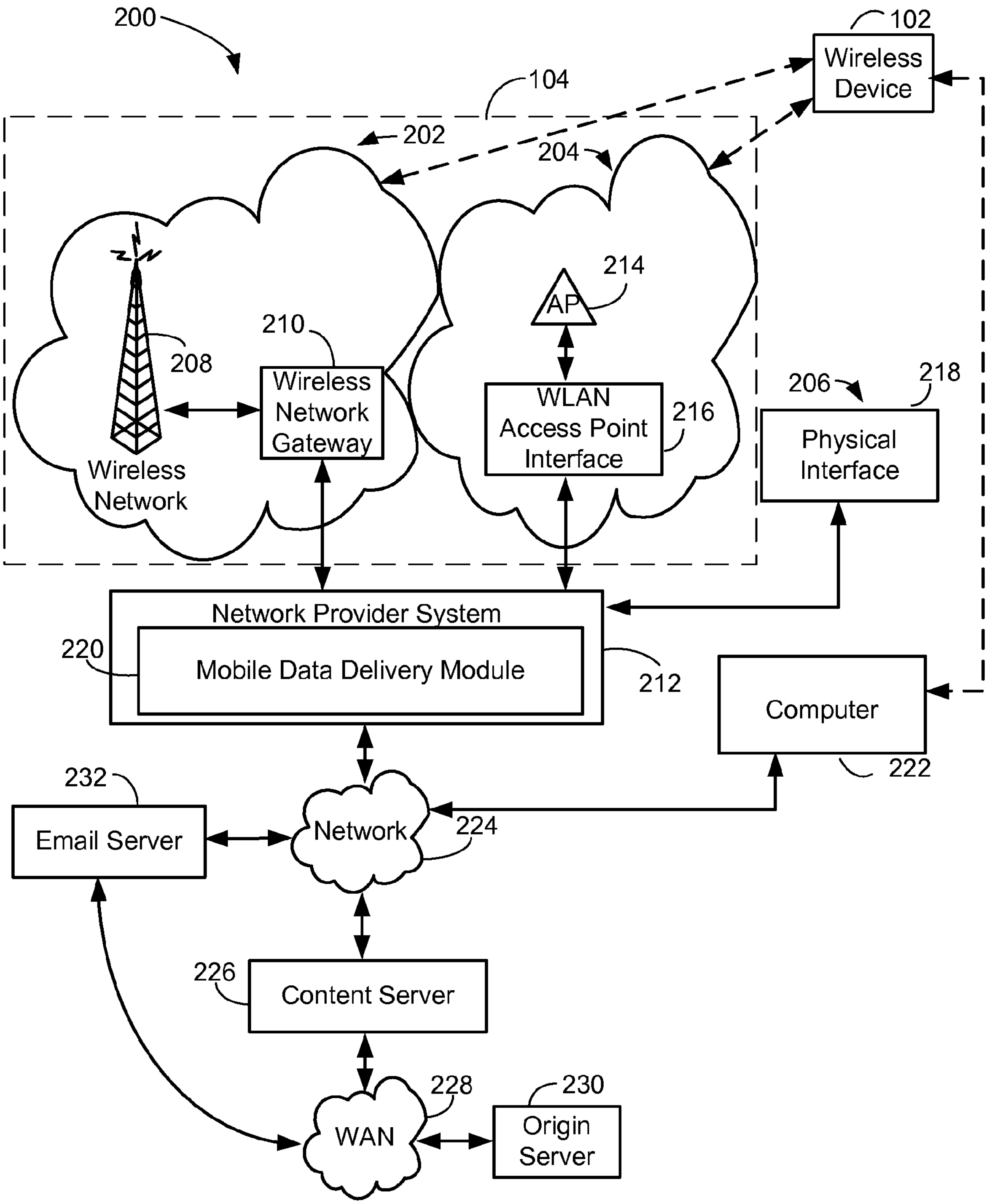
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), Evolution-Data Optimized (EV-DO), or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
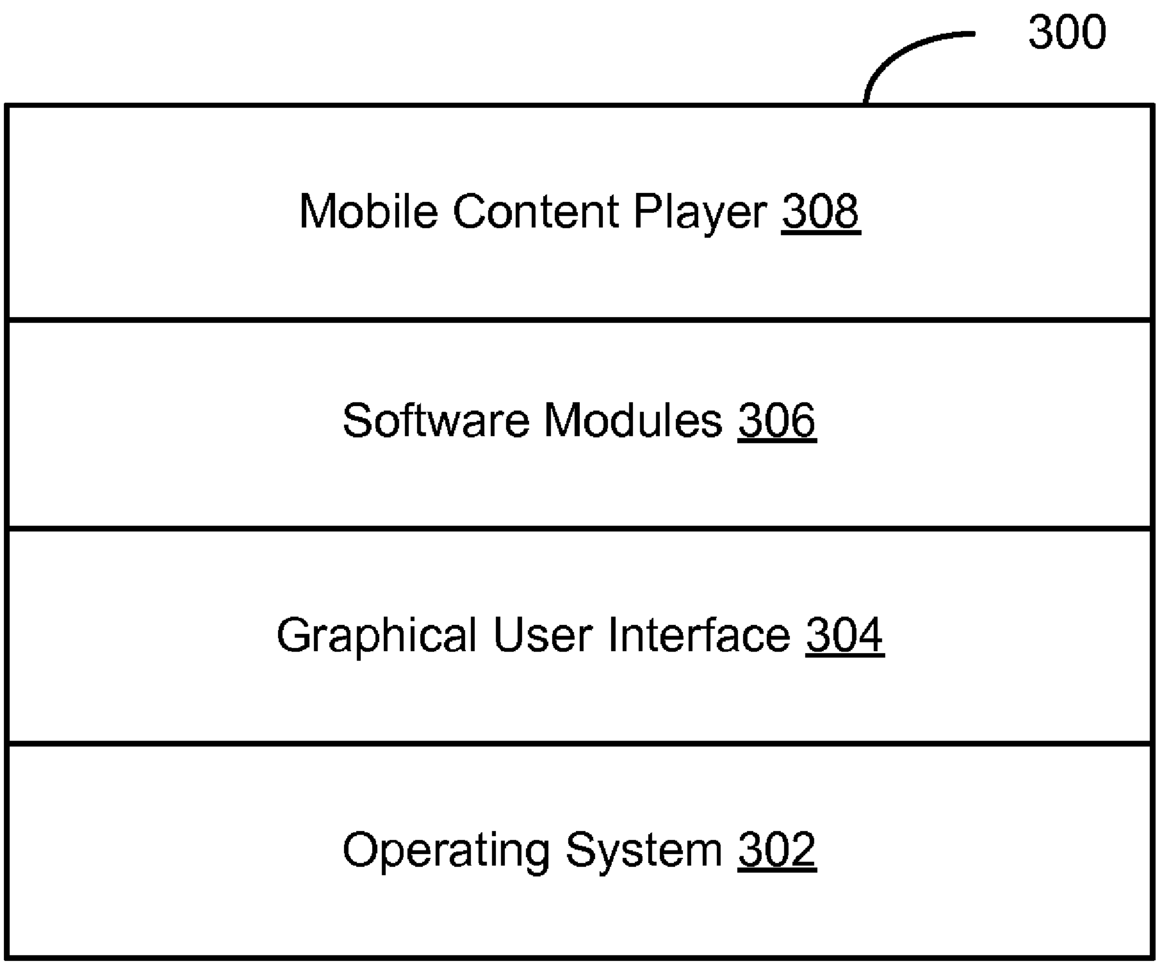
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel or track ball 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content player 308, which may also be referred to as a content delivery module. In one example, the mobile content player 308 may be integrated into the operating system 302. Alternatively, the module 308 may be a separate software component, as illustrated in FIG. 3. The mobile content player 308 may be responsible for managing content delivery to the wireless device 102 and/or playing the content delivered. Operation of the mobile content player 308 will be described in more detail below, in connection with FIGS. 5, 6, and 7.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
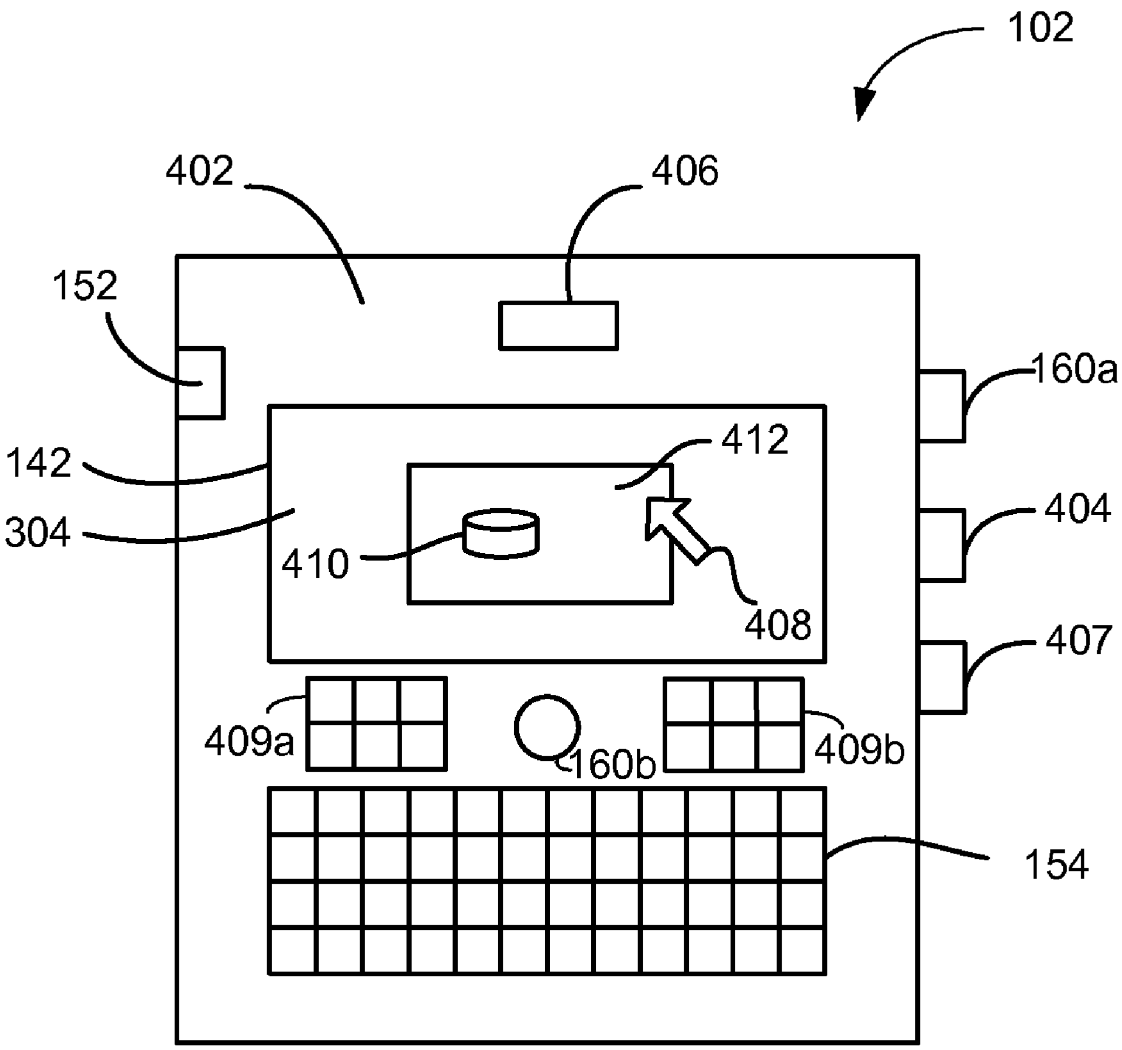
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160*a* or other device for navigation such as a trackball 160*b*, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409*a* and 409*b*. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160*a*, the trackball 160*b*) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

The term "push" is used herein to refer to a method of content delivery to a wireless device that is automatically delivered by a content server without any action being required on the part of the wireless device user.

Figure 5:
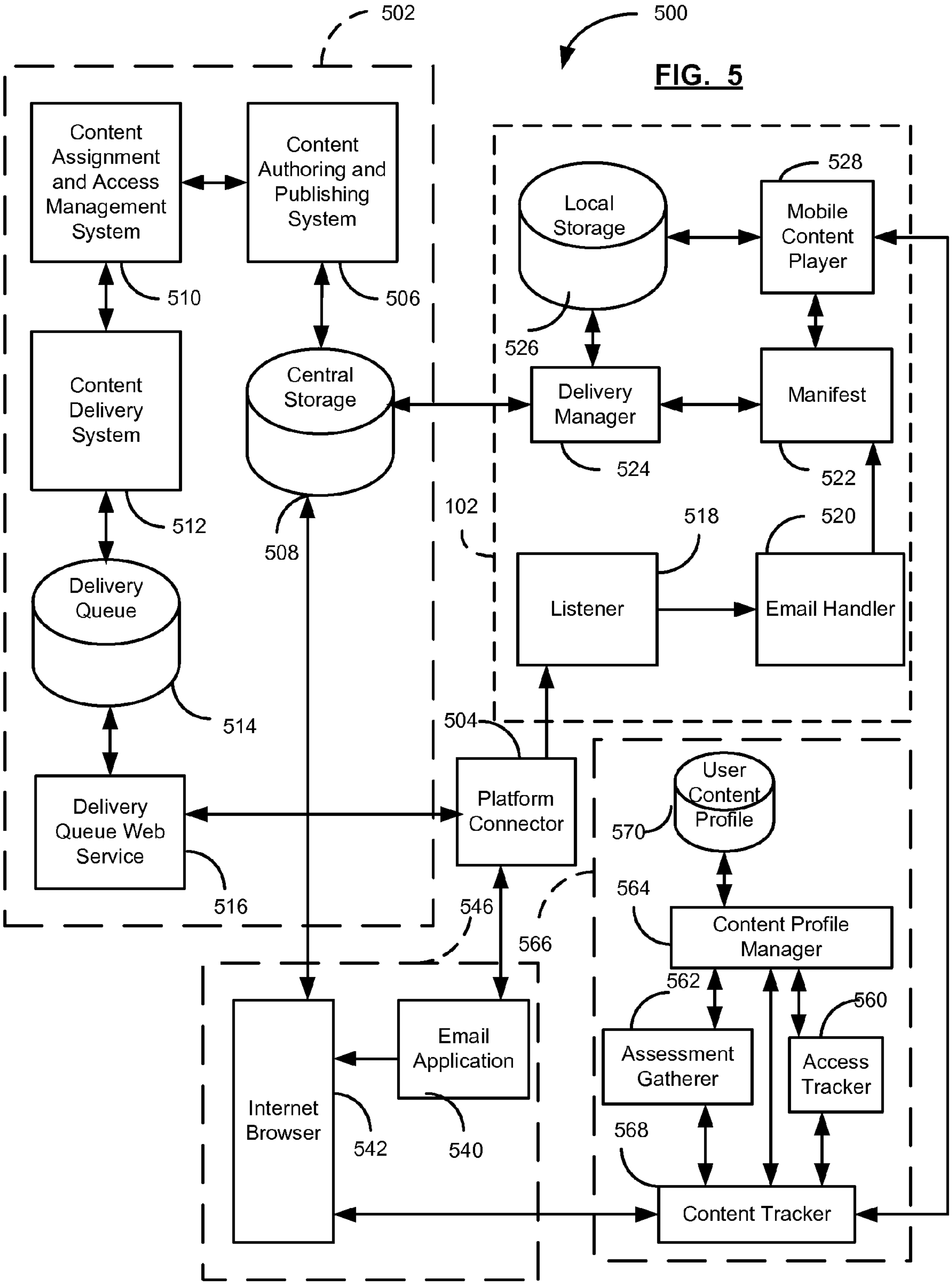
FIG. 5 shows in simplified block diagram form aspects of the communications system of FIG. 2 and the wireless device of FIG. 1 configured to deliver synchronized content to multiple platforms in accordance with one embodiment for the desktop computer.
Figure 6:
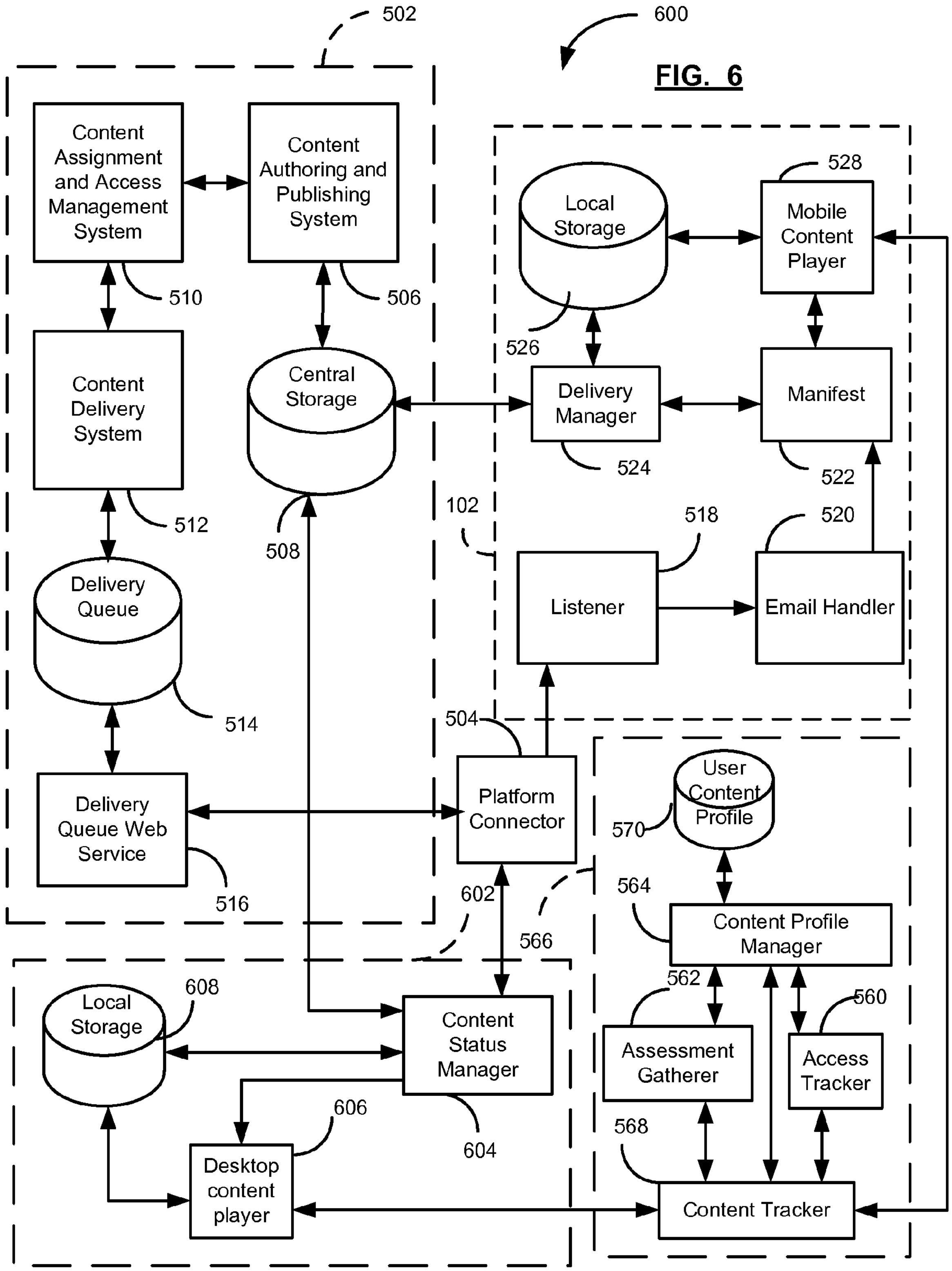
FIG. 6 shows in simplified block diagram form aspects of the communications system of FIG. 2 and the wireless device of FIG. 1 configured to deliver synchronized content to multiple platforms in accordance with another embodiment for the desktop computer.

Reference is next made to FIGS. 5 and 6. FIG. 5 shows in simplified block diagram form the communications system of FIG. 2 and the wireless device of FIG. 1 configured to deliver synchronized content to many delivery devices on different platforms including, for example, a wireless device and a desktop computer in accordance with one embodiment. The system shown in FIG. 5 is referred to collectively as the system 500. Reference is also made to FIG. 6 which shows in simplified block diagram form another embodiment of the system. The system shown in FIG. 6 is referred to collectively as the system 600. Many components of system 600 are identical to those of system 500 and will not be repeatedly described.

The system 500 generally includes a content server 502, a platform connector 504, a desktop computer 546 and a wireless device 102. The content server 502 may, for example, be implemented by the content server 226 shown in FIG. 2 and the platform connector 504 may be implemented, for example, by the network provider system 220.

The content server 502 generally comprises a content authoring and publishing system 506, a central storage 508, a content assignment and access management system 510, a content delivery system 512, a delivery queue 514, and a delivery queue web service 516.

The content authoring and publishing system 506 may be implemented using a number of systems in the market today, which provide for creation and central storage of content. Alternatively, the content authoring and publishing system 506 may be implemented using solutions yet to be developed. The authoring may be accomplished by an appropriate application and then saved to a central server, such as the central storage 508, for access by the delivery devices. For example, an audio clip may be authored in an audio editing tool, saved, and then published to a central content server or central storage 508. In one example, another system 506 may manage access to this content.

Once the content has been created, the content may be assigned to users for consumption. This assignment may function as a trigger for the delivery to occur.

In one example, the content assignment and access management system 510 may make a request to the content delivery system 512 to send all the content directly to the user. This request may contain information identifying what type the content is (e.g., a learning course) and target user information so the delivery can be directed to specific delivery devices belonging to specific individual users. The request may also contain information that the content server 502 uses to find all elements of the content to be delivered.

The content assignment 510 may not need any knowledge of the mobile transport platform being used, which may be configured in the platform connector system 504 and may be tied to a user's delivery device type.

The content delivery system 512 may receive requests for delivering content. These requests may originate from a system component that is assigning the content to users, such as the content authoring and publishing system 506 and/or the content assignment and access management system 510. When these requests are received, the content delivery system 512 may look up the target and determine if the user has a delivery device and if that device has a transport defined. The request may be verified to be in the proper format and then processed. If the user does not have a delivery device or a transport has not been defined, then the appropriate response is returned to the requesting system. Every user may register with the content delivery system 512 to ensure the deliveries can take place, specifying details about all of their delivery devices, including mobile devices 102 and desktop computers 546. Once this information is gathered, the content delivery system 512 may place the request onto the delivery queue 514 with a status indicated as "new". In one example, the request may be an XML request.

Each XML request may be populated with a company identifier that determines which company is authorized to view the XML request on the delivery queue 514. Modifications to the content may occur after the content has been delivered. It may be left to the calling application to send a new delivery request for the content if it has changed.

The delivery queue web service 516 may listen for requests made by the platform connector 504. These requests may determine if there are items on the queue 514 that the platform connector 504 is able to extract and deliver.

The platform connector 504 may poll the delivery queue web service 516 in predefined intervals to see if there is any content available that needs to be delivered. The platform connectors 504 may be configured for a specific content server or publisher. The platform connectors 504 may issue a web services call to the delivery queue web service 516. This call may contain user credentials that the web service 516 authenticates to determine what queue items the platform connector 504 is authorized to see. If there are no items authorized, the platform connector 504 may wait for a predefined time interval to elapse and try again. If the platform connector 504 does find an item on the queue, the platform connector 504 may retrieve the queued item as, for example an XML document that describes the content. The platform connector 504 may only process one queued item at a time, but may alternatively be configured to process multiple items at a time.

When the platform connector 504 receives an XML transaction from the web service 516, the platform connector 504 looks up the intended transport and the delivery device type. Each user has a profile set at the content server 502 to identify what delivery platforms they have access to. The user identifies if he wishes to receive content on a mobile device, on a desktop computer (via a desktop player or an internet browser, or through both methods).

For example, a video file which was created in the content authoring and publishing system 506 will be stored in the central storage 508. Because multiple formats of that video file will be needed, depending on the type of delivery devices of the user, different formats of the video file will also be stored in the central storage 508. The video file format accepted for display on a mobile device will most likely not be the same as that accepted for display by the internet browser of the desktop computer. This is referred to as transcoding the file. All necessary formats of the same content item are stored in the central storage 508.

This transcoding of the content items into different formats for delivery to different delivery devices is managed by a conversion/transcoding system of the content assignment and access management system 510 which communicates with the content authoring and publishing system 506 and external file format transfer applications to store appropriate formats for the content items in central storage 508.

If a version for a particular platform is not readily available in the central storage 508, it can be created by the conversion/transcoding system of system 510 upon indication by the platform connector 504 that a delivery in a specific delivery format is required.

The images may be stored, for example, in one or more image files such as, for example, PNG, GIF, JPEG or the like. The images may be resampled to a resolution compatible with the delivery device. Any audio that was inserted into the content as, for example, MP3 files or WAV files can be transcoded into, for example, an AMR Audio format. The conversion/transcoding system may convert the format of the document, such as an open XML format, into a format that may be able to be rendered on the delivery device. Other similar conversions for other content elements may be performed by the conversion/transcoding system, according to techniques known to those skilled in the art or solutions yet to be developed. With the transcoding system, the content is converted from the first format to a second format compatible with or renderable by the delivery device.

If the specified delivery devices for a user includes a mobile device, the platform connector 504 delivers the content to the wireless device 102. If the specified delivery devices for a user includes a desktop computer 546, the platform connector 504 can deliver the content to the desktop computer 546 (see FIG. 6) or an email can be sent to the user's email application 540 (see FIG. 5). The email includes a link to the most up-to-date content which can be copied into a browser or clicked within the email application to trigger access to the content in the browser.

The platform connector 504 may further return result codes back to the delivery queue web service 516 based on the ability of the platform connector 504 to successfully send the delivery request to the delivery device infrastructure.

The platform connector 504 may work simultaneously with several platforms or transport types. This may include any transport that allows a real-time delivery of content to the delivery device, or any mechanism that publishes the content directly to the delivery devices.

In the case where the delivery device is a wireless device 102, the wireless device 102 memory 300 generally includes a number of components related to the mobile content player 308. The components that relate to the mobile content player 308 include a listener 518, an email handler 520, a manifest 522, a delivery manager 524, a mobile content player 528. The memory 300 also includes at least one area used for local storage, indicated by local storage 526.

The manifest 522 is received and stored in the memory 300 for use by the content player 308, but may be a working data store as opposed to an application component.

One aspect of the present application may make use of caching servers for content delivery to the wireless devices 102. When a delivery occurs, the content may be retrieved from a local caching server instead of the centralized content server 502. The mobile content player 308 may be programmed to render various content types. The mobile content player 308 may accept the delivery of content from the content delivery system 512 through the content server 502. The mobile content player 308 may also accept, for example, notifications when a new course has been delivered to the wireless device 102, which may be in addition to the wireless device 102 receiving an email. There may be configurable notification options on the content delivery system 512.

When the content package has been delivered, the Mobile Content Player 308 can provide a visual notification and report the delivery status back to the content server. The content server then sends a notification via email to the Mobile Device 102.

The delivery manager 524 may process a manifest file (e.g., the manifest 522) by retrieving each item specified by URL in the manifest file 522 from the central content storage 508. These items may be placed in the wireless device local device storage 526. Once content is delivered to the wireless device 102, the content remains in the local storage 526 for the mobile content player 528 to render it. The delivered content may be removed from either the player 308 or from the content delivery system 512. If the player 528 attempts to render content that has been removed from the local storage 526, then the player 308 may automatically attempt to retrieve the content from the content server 502.

The listener 518 may listen for the request sent from the platform connector 504. The listener 518 may receive the XML manifest 522 and extract each content URL from the XML manifest 522. The listener 518 may then send that URL to the delivery manager 524 for content retrieval using the content URLs.

If a request is received via e-mail, the wireless device 102 processes the e-mail through the email handler 520. The email handler 520 decrypts the contents of the email, if encrypted, that contain the instructions for retrieving the content manifest, reads the e-mail information into memory, and then deletes the e-mail from the user's wireless device 102 email inbox. The email handler 520 may also authenticate the email by checking to see that the destination email address, which in one example may be contained in an encrypted header of the email, matches the email address of the wireless device 102 on which the email handler 520 is installed. The email handler 520 uses the information stored in memory to make an HTTP request to the content authoring and publishing system 506 requesting the content manifest. When the content authoring and publishing system 506 determines that a user's e-mail is valid (e.g., the system 506 may also authenticate the originating email address of the wireless device 102, which may be contained in an encrypted header), the system 506 sends the manifest to the mobile device 102 through its HTTP response, and the manifest is saved as the manifest 522. Alternatively, the system 506 may also authenticate a PIN received from the wireless device 102. The email authentication performed by the email handler 520 and/or the content provider 502 as described above may function to ensure that only authorized recipients are receiving content. In one example, if a user of the wireless device 102 forwarded an email originating from the content server 502 to another user, the other user would not be able to retrieve content from the content provider 502.

Therefore, the mobile device 102 has received one representation of the content, the representation being adequate for the mobile device.

The desktop computer 546 includes an email application 540 and an internet browser 542. In the case where the delivery device is a desktop computer 546, the platform connector 504 communicates with the email application 540 by sending an email to the user's specified email address for the desktop computer 546. Once the user clicks on the URL link provided in the email to reach the content, the internet browser 542 makes an HTTP request to the content authoring and publishing system 506 requesting the content manifest. When the content authoring and publishing system 506 determines that a user's e-mail is valid (e.g., the system 506 may also authenticate the originating email address of the desktop computer 546), the system 506 sends the content to the desktop computer 546 internet browser 542. In one example, if a user of the delivery device forwarded an email originating from the content server 502 to another user, the other user would not be able to retrieve content from the content provider 502. This method and system may add security to the distribution of content, such as Word documents, as a user cannot redistribute the content that has been pushed to their delivery device in this manner.

Email authentication may also be performed to ensure that only authorized recipients are receiving content. In the case of a desktop computer, the URL link may redirect to a logon page where a user ID and password are required to proceed with the content access.

The content provided to all delivery devices of a single user is the same. Reformatting of content and re-coding of content is handled by the platform connector 504 depending on delivery device type and transport type specified for that user. There is no authoring necessary to ensure that content is accessible on all delivery devices for a user. In that sense, the content is synchronized for access on all delivery devices of a user without further authoring by the platform connector 504.

The desktop computer has therefore received another representation of the same content, this other representation being adequate for the desktop computer and would not necessarily have been deliverable to the mobile device.

The disclosed method and system may also provide a content tracking sub-system 566 which can track when the content was accessed by the user and which may gather assessment data if assessment questionnaires are part of the content. The content tracking sub-system 566 can include a content tracker 568, an access tracker 560, an assessment gatherer 562, a content profile manager 564 and a user content profile storage 570.

In each delivery device where a content player is provided, the player is equipped with a player tracker which logs events related to the content received and played on the player. The log file created contains an entire session's worth of tracking information about each content portion and each assessment question answered. If the user is accessing the content while his delivery device is offline, the log file tracks all of this activities until the delivery device is back online.

This log is then forwarded to the content tracking sub-system 566. If the device was offline when the log file was created, the log file is forwarded when the device is back online. The content tracking sub-system 566 can be located in a server, accessible by all delivery devices. It may be in the same server as the content provide 502 or elsewhere. If the delivery device is a mobile device 102, the mobile content player 528 prepares the mobile content log.

If the delivery device is a desktop computer 546, the content is typically not accessible while the computer is offline. Therefore, the internet browser 542 can prepare the log file and the log file is typically linked to a viewed page of content. Alternatively, the URL address to which the email directs the user for access to the content can be programmed to gather the log information and prepare the desktop content log file using a JAVA applet, a Flash player, integration into an existing application that allows content to be accessed by the user, etc.

As will be readily understood, the log files (and the tracking information in general) can contain tracking information concerning the whole rendering of the content to the user, the log file being forwarded to the content tracking sub-system 566 once the rendering session is terminated. Alternatively, partial log files can be cumulated and forwarded based on a logical distribution, such as when specific sections of the content are accessed or when a number of tracked activities have occurred. For both the partial and complete log files, it is possible to store the log files in the delivery device until appropriate to forward them to the content tracker 568.

The mobile content log file and the desktop content log file, if any, are sent to the content tracker 568. Content tracker 568 communicates with content profile manager 564 to retrieve a user content profile for the user from user content profile storage 570. An access tracker 560 extracts relevant access information from the received log file. For example, the date, time, duration of display and delivery device type information for each access to the content may be extracted from the log file. This extracted access data is provided to the content profile manager 564 for updating the user profile. An assessment gatherer 562 extracts relevant assessment information from the received log file. For example, answers to each question of a questionnaire may be compiled for a user. This assessment can be used to gather feedback or to assess the user's understanding of the provided content. The newly gathered assessment information is then added to the user content profile by the content profile manager 564.

Reports can be made using the information contained in the user content profiles of user content profile storage 570. The reports can include detailed access information, and gathered assessment data. This can be used by content providers or others to determine statistics about the use and understanding of users of the content. The content profile manager 564 can be equipped with a reporting interface to control access to the user content profiles and to report compiled access and assessment data in a human readable format.

Such access data can be used by the content provider to limit access to the content to a limited number of delivery devices on any type of platform. For example, if the content is a lecture on a topic including a questionnaire at the end, the number of accesses to the lecture could be unlimited while the filling out and submission of the questionnaire could be limited to two times. Then, if a student watches the lecture on his mobile device and fills out and submits the questionnaire but is not satisfied with his answers, he can access the lecture a few other times on his mobile device or his desktop computer or both and can then complete the questionnaire a second time. After two separate and complete access to the questionnaire, the questionnaire is no longer available to be filled out by the user.

The access and assessment data can also be used by the content provider to adjust the content via the content authoring and publishing system 506. If all assessment data gathered indicates that the content is not understood, changes to the content may be necessary.

The compiled access and assessment data includes information logged for a same user on all of his delivery devices and therefore ensures a global tracking of his activities.

Because such tracking information is obtained, the system and method allow to facilitate accessing of the content by the user by allowing a user to stop his accessing of the content in one delivery device and pick up the accessing of the same content in another delivery device at the same point where he left it off. Indeed, because the access activities of the user are tracked by the access tracker 560, the user content profile in the storage 570 may include such information as, for example, slide 5 of a presentation displayed. This information can then be provided to all players on all delivery devices for that user, namely to the mobile content player 528 and the internet browser 542. Therefore, the next time the user accesses the content, the presentation can be displayed at the slide where it was left off on one delivery device, namely at slide 5, even if the content is now being accessed through another delivery device.

An Administrator of the system can set the delivery platforms for a user. The Administrator can also allow or disallow the users from managing their delivery platform settings.

While the content server 502, mobile device 102, desktop computer 546, content tracking sub-system 566 and platform connector 504 are represented as distinct components and have a number of sub-components, any of these components or subcomponents may be implemented as modules running on a number of interconnected servers or on a single server, depending on the design criteria of a particular application. For example, any of the components 502, 504, 506, 508, 510, 512, 514, and 516 may be implemented on any of the network provider system 212, the network 224, the content server 226, the email server 232, or the origin server 230. Alternatively, in one example, the components 502, 504, 506, 508, 510, 512, 514, and 516 may be implemented on a single one of the network provider system 212, the network 224, the content server 226, the email server 232, or the origin server 230. Additionally, while one content server 502 and one platform connector 504 are shown as an example in FIGS. 5 and 6, the present description is intended to include any number of content servers operating to provide content to any number of wireless devices 102 and any number of desktop computers 546.

In FIG. 6, only the desktop computer 602 components have changed with respect to FIG. 5. The desktop computer 602 is an alternative embodiment to the desktop computer 546 of FIG. 5. The desktop computer 602 now contains a content status manager 604 which communicates with the platform connector 504 to obtain content for the desktop content player 606. A local storage 608 is also provided on the desktop computer to store at least a portion of the content. This version of the desktop computer 602 allows off-line accessing of the content since the local storage 608 is always available to the desktop computer 602.

Both the mobile content player 528 and the desktop content player 606 can prepare the content log file even if the delivery device is offline. The log file can be provided to the content tracker 568 once the delivery device detects that communication to the content tracker 568 is made available.

Figure 7A:
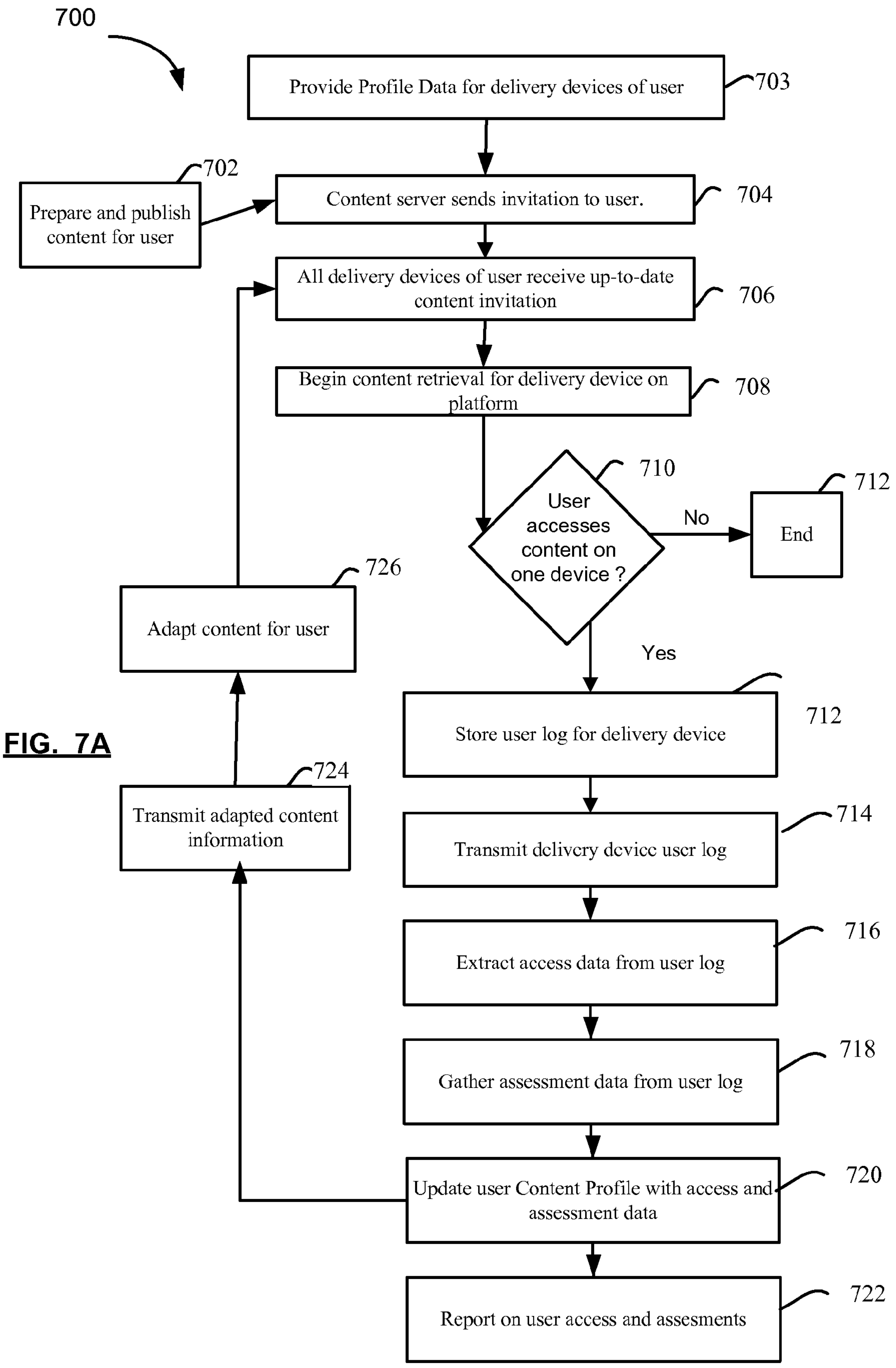
FIG. 7 comprises FIG. 7A and FIG. 7B which show in flowchart form steps of a method for delivering synchronized content to multiple platforms in accordance with one embodiment.
Figure 7B:
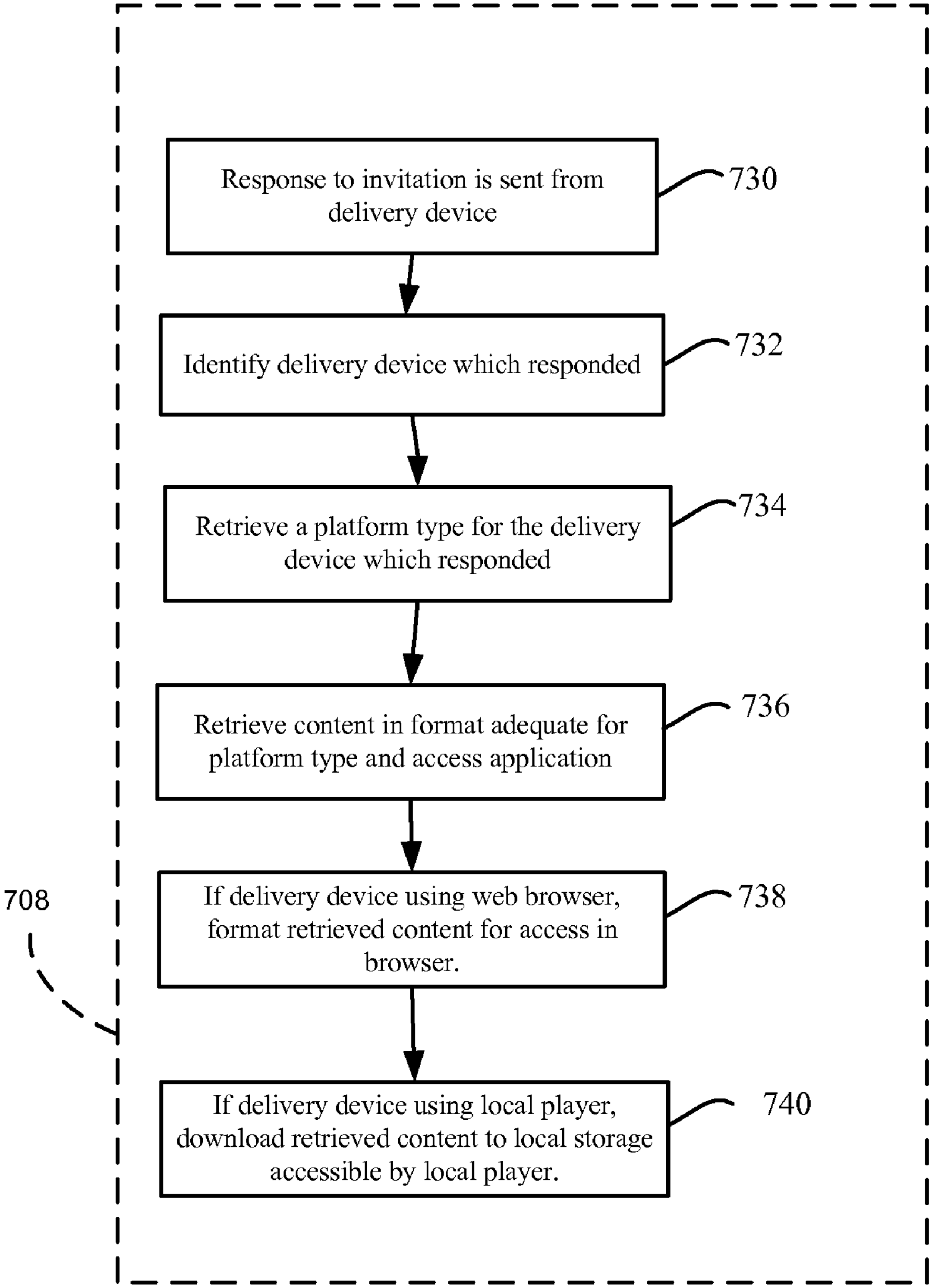

Reference is next made to FIG. 7A and FIG. 7B, which show in flowchart form a method 700 for delivering content to multiple platforms used by a user. As shown in FIG. 7A, the content is prepared and published for a user 702. Profile data is provided about the user for his choice of delivery devices 703 on which to provide content. The content server sends an invitation to the delivery devices of the user 704. All delivery devices for the user receive the most up-to-date content invitation 706. The retrieval of content is begun 708 for that particular delivery device on its platform. If the user does not access the content 710, the method ends. If the user accesses the content 710, a log is stored for that platform 712. The platform log is transmitted 714. Access data is extracted from the user log 716. Assessment data is gathered from the user log 718. The user content profile is updated with access and assessment data 720. It is then possible to report on user access and assessment 722. Additionally, adapted content information can be transmitted 724 and content can be adapted for the user 726. The delivery devices then receive the invitation for the most up-to-date content 706 and the steps are repeated.

As shown in FIG. 7B which details step 708 of FIG. 7A, after the delivery device has received the content invitation 706, a response to the invitation is sent from the mobile device or from the desktop 730. In the case of the mobile device, the response is a request from the delivery manager 524 to retrieve content. In the case of the desktop computer 546, the response is a login by the user into the website to which pointed the URL contained in the email of the invitation (see FIG. 5). In the case of the desktop computer 602, the response is a request from the content status manager 604 to retrieve content (see FIG. 6).

Then, the device which responded is identified 732. The platform type for that device which responded is retrieved 734. The content is then obtained in a format adequate for the platform type 736 and the access application (browser or local player). If the delivery device uses a web browser to access the content, the retrieved content is formatted accordingly for access in the browser 738. If the delivery device uses a local player, the content is sent to the device and the device begins receipt/download of the content 740. The content can be fully stored in the local storage 526, 608 or partly stored in local storage 526, 608 with additional downloads beginning as need be.

While the steps of the method 700 are shown as occurring in a particular order, it will be appreciated by those skilled in the art that many of the steps are interchangeable and may occur in different orders than that shown without materially affecting the end results of the method 700.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for synchronizing content delivery to a plurality of delivery devices of a single user, including at least one computer connected to internet and at least one mobile device, the method comprising:

sending an invitation to deliver content to said plurality of delivery devices of said single user;

receiving at least two responses to said invitation from separate ones of said plurality of delivery devices, for each response received:

identifying a responding delivery device of said plurality of delivery devices from which said response is received using profile data associated with the single user, wherein the profile data provides information identifying the plurality of delivery devices of the single user; and retrieving and providing a delivery version of said content in a delivery format acceptable for an identified platform type of said responding delivery device.

2. The method as claimed in claim 1, further comprising:

retrieving an access application type of said responding delivery device accepting said invitation corresponding to an access application on said responding delivery device for accessing said content;

wherein said access application is one of a browser connected to internet and a local player on said delivery device having access to a local storage on said delivery device;

wherein said providing said delivery version comprises, depending on said access application, one of sending said delivery version of said content for download by said responding delivery device and providing said delivery version for accessing in said browser on said responding delivery device.

3. The method as claimed in claim 1, further comprising tracking usage of said content by said single user on each said responding delivery device.

4. The method as claimed in claim 3, wherein said tracking comprises:

storing a user log for each of said responding delivery device, said user log including a time stamp and an activity description for at least one activity carried out by said single user on said content;

transmitting said user log for each of said responding delivery device to a content tracker; and cumulating said user log from each of said responding delivery device for said single user at said content tracker in a user content profile.

5. The method as claimed in claim 4, wherein said activity is one of a beginning of an access to said content, an end of an access to said content, a completion of rendering of a section of said content, and an inputting of an answer in an assessment portion of said content.

6. The method as claimed in claim 3, further comprising extracting access statistics from said user content profile for said single user.

7. The method as claimed in claim 3, further comprising gathering assessment statistics from said user content profile for said single user.

8. The method as claimed in claim 7, further comprising reporting at least one of said access statistics and said assessment statistics.

9. The method as claimed in claim 6, further comprising:

providing a rendering limit, said rendering limit being a number of times said single user is allowed to render said content on said plurality of delivery devices;

obtaining an access count from said access statistics, said access count being a number of times said single user has accessed said content on any of said delivery devices;

comparing said access count to said rendering limit; and upon determining that said access count is equal to said rendering limit, blocking access to said content on all said responding delivery devices.

10. The method as claimed in claim 9, wherein said blocking access comprises transmitting a blocked access replacement content to said responding delivery device.

11. A communications network having at least one content server configurable to deliver content to a plurality of delivery devices of a single user, the content server being configured for:

sending an invitation to deliver content to said plurality of delivery devices of said single user through a platform connector;

receiving at least two responses to said invitation at said platform connector from separate ones of said plurality of delivery devices;

for each response received:

identifying a responding delivery device of said plurality of delivery devices from which said response is received using profile data associated with the single user, wherein the profile data provides information identifying the plurality of delivery devices of the single user; and retrieving and providing a delivery version of said content in a delivery format acceptable for an identified platform type of said responding delivery device from a central content storage.

12. The communications network as claimed in claim 11, wherein said content server is further configured for:

retrieving an access application type for said responding delivery device accepting said invitation corresponding to an access application on said responding delivery device for accessing said content;

wherein said access application is one of a browser connected to internet and a local player on said delivery device having access to a local storage on said delivery device;

wherein said providing said delivery version comprises, depending on said access application, one of sending said delivery version of said content for download by said responding delivery device and providing said delivery version for accessing in said browser on said responding delivery device.

13. The communications network as claimed in claim 11, further comprising a user tracker for tracking usage of said content by said single user on each said responding delivery device.

14. The communications network as claimed in claim 13, further comprising:

a content tracker for cumulating said usage tracked by said user tracker from each of said responding delivery device for said single user in a user content profile.

15. A synchronized content delivery system for delivering synchronized content to a plurality of delivery devices, the system comprising:

a plurality of delivery devices of a single user, including at least one computer connected to internet and at least one mobile device; and a platform connector for sending an invitation to deliver content to said plurality of delivery devices of said single user and for receiving at least two responses to said invitation from separate ones of said plurality of delivery devices, said platform connector configured to carry out, for each response received:

identifying a responding delivery device of said plurality of delivery devices from which said response is received using profile data associated with the single user, the profile data providing information identifying the plurality of delivery devices of the single user; and retrieving and providing a delivery version of said content in a delivery format acceptable for an identified platform type of said responding delivery device of said single user.

16. The synchronized content delivery system as claimed in claim 15, wherein said platform connector further is configured for retrieving an access application type for said responding delivery device accepting said invitation corresponding to an access application on said responding delivery device for accessing said content;

wherein said access application is one of a browser connected to internet and a local player on said delivery device having access to a local storage on said delivery device;

wherein said providing said delivery version comprises, depending on said access application, one of sending said delivery version of said content for download by said responding delivery device and providing said delivery version for accessing in said browser on said responding delivery device.

17. The synchronized content delivery system as claimed in claim 15, further comprising a user tracker for tracking usage of said content by said single user on each said responding delivery device.

18. The synchronized content delivery system as claimed in claim 17, further comprising:

a content tracker for cumulating said usage tracked by said user tracker from each of said responding delivery device for said single user in a user content profile.

19. The method as claimed in claim 1 further comprising retrieving the profile data associated with the single user from a user profile storage.

20. The method as claimed in claim 1 further comprising retrieving the platform type of the responding delivery device.

21. The communications network as claimed in claim 11 wherein the content server is further configured for retrieving the profile data associated with the single user from a user profile storage.

22. The communications network as claimed in claim 11 wherein the content server is further configured to, for each response received, retrieve the platform type of the responding delivery device.

23. The synchronized content delivery system as claimed in claim 15 further comprising a user profile storage including the profile data associated with the single user.

24. The synchronized content delivery system as claimed in claim 15 wherein the platform connector is further configured to, for each response received, retrieve a platform type of the responding delivery device.

* * * * *